:::::::::::::::::::::::::::::::::::::::::::::::::::::::::::::::::::::::::::::::::::::::::::::::::::::::::::::::::

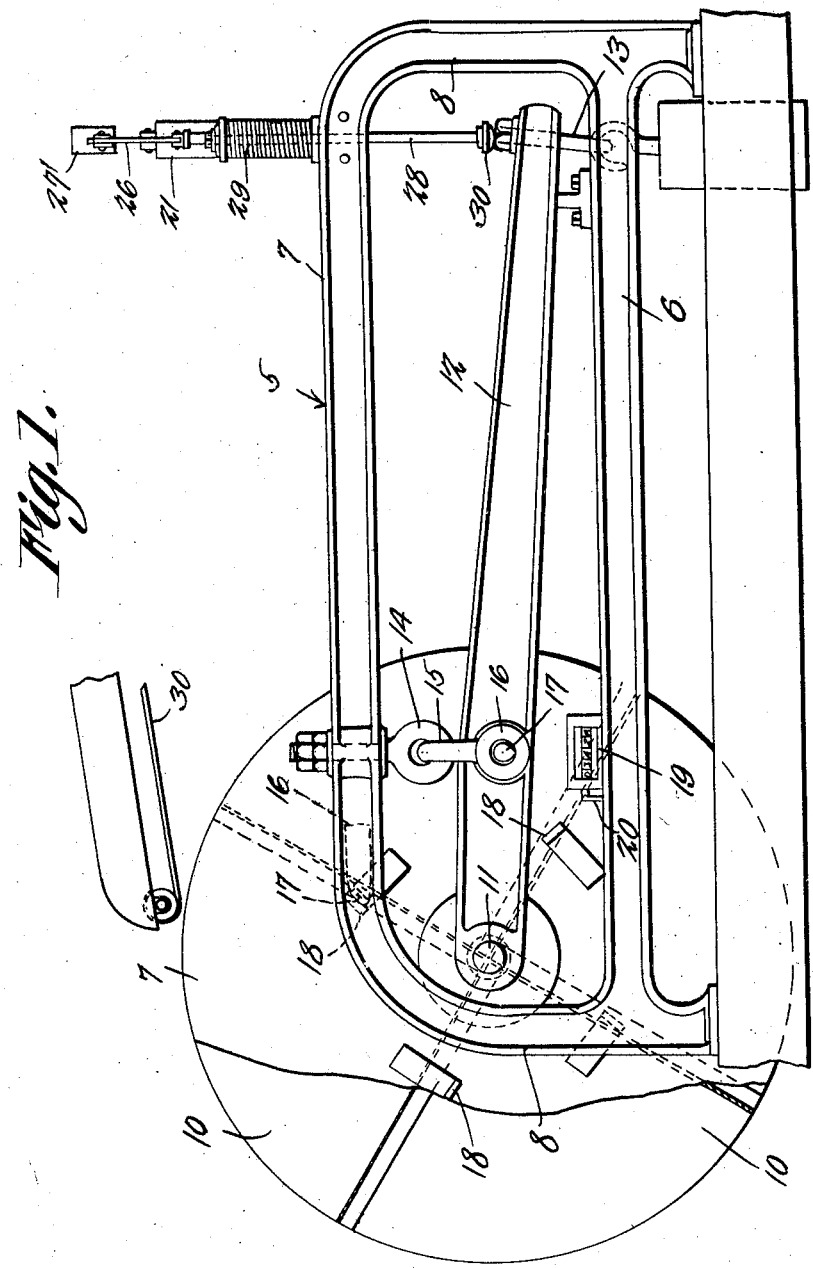

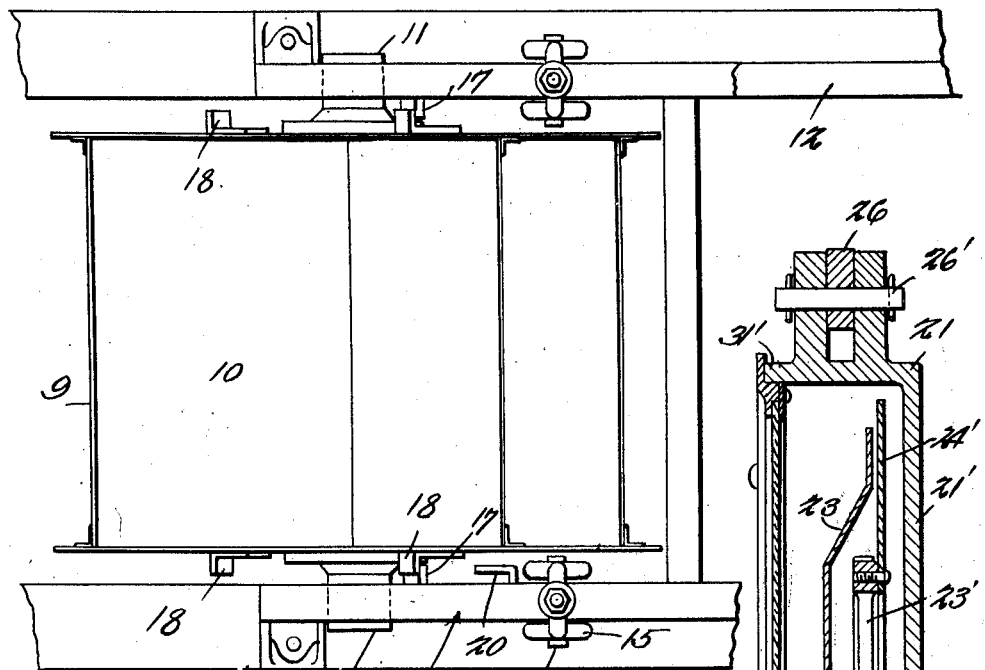
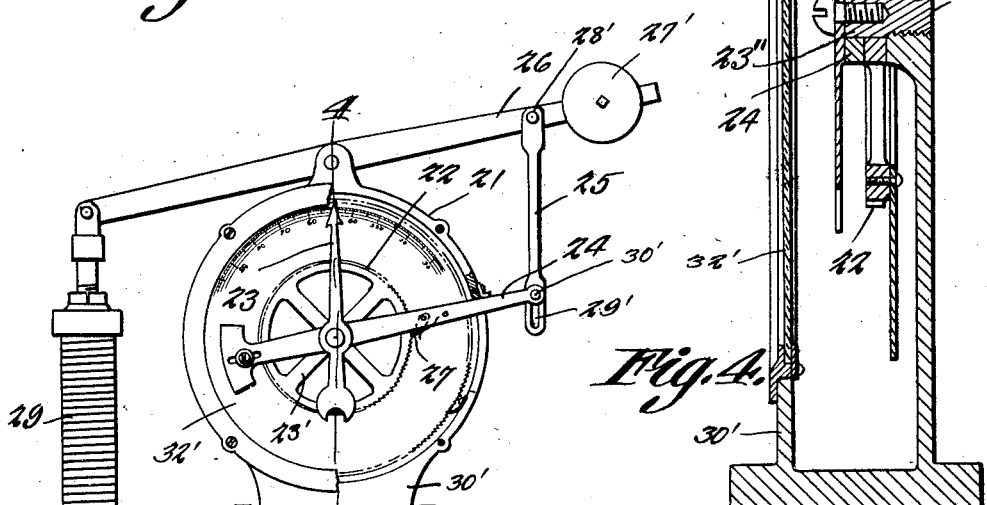

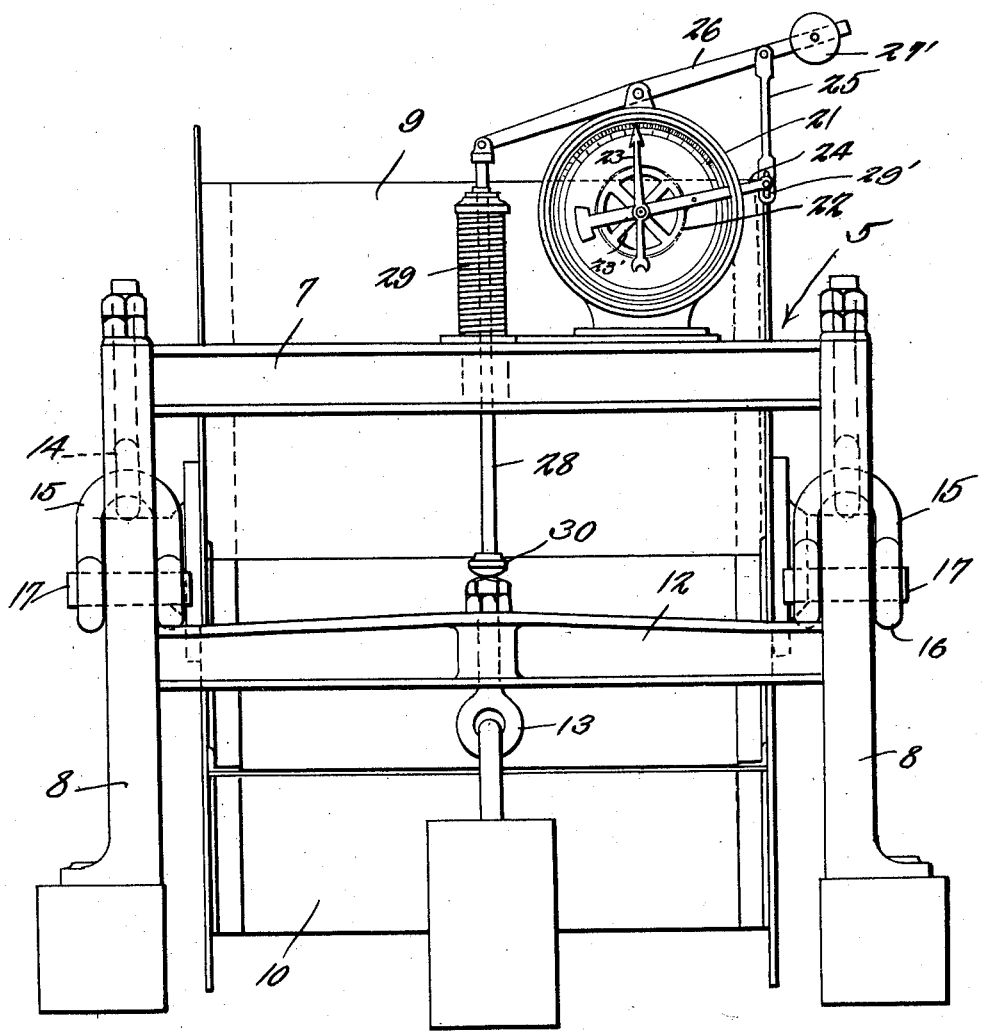

UNITED STATES PATENT OFFICE.

GEORGE A. EVANS AND JAMES E. ELLISON, OF LAYTON, UTAH.

AUTOMATIC SCALE.

1,342,670.  Specification of Letters Patent.  Patented June 8, 1920.

Application filed September 11, 1919. Serial No. 323,071.

*To all whom it may concern:*

Be it known that we, GEORGE A. EVANS and JAMES E. ELLISON, citizens of the United States, residing at Layton, in the county of Davis, State of Utah, have invented a new and useful Automatic Scale, of which the following is a specification.

The present invention relates to weighing scales, its principal object being to provide a weighing scales which may be set to dump the contents of the scales upon placing a predetermined quantity in the same.

A further object of the invention is to provide a recording weighing scales which will dump the bulk being weighed upon over-balancing of the balance beam.

Still another object of the invention is to provide an automatic weighing scales wherein the bulk to be weighed is conveyed to the scales, which when the balance beam thereof is over-balanced will discharge the bulk; the construction being such as to always be ready for the weighing operation.

It is another object of the invention to provide a receptacle having a plurality of compartments for receiving the bulk to be weighed, which will discharge the same upon placing a predetermined amount therein; the discharging operation causing the receptacle to be moved to a position where an empty compartment will be in position to receive the next load to be weighed.

Another object of the invention is to provide a weighing scales, by which, should an overweight be deposited thereon, the amount of overweight will be accurately registered.

Another general object of the invention is to provide a weighing scales having the above characteristics which is simple in construction, which consists of few parts, and which may be manufactured and sold at minimum cost.

With the above and other objects and advantages in mind, the invention consists of combinations of elements, constructions and arrangement of parts, all of which will be hereinafter enlarged upon and set forth in the appended claims, the invention being illustrated in the attached drawings, wherein:—

Figure 1. is a side elevation of a weighing scales constructed in accordance with the invention, parts being broken away;

Fig. 2. is a fragmentary top plan view of the scales;

Fig. 3. is a detail elevation of a weight recorder used in conjunction with the scales;

Fig. 4. is a vertical section view taken on line 3—3 of Fig. 3;

Fig. 5. is an end elevation of the scales.

Referring to the drawing wherein like characters of reference designate like parts in all the views the numeral 5 designates a substantial rectangular horizontal frame which includes upper and lower parallel beams 6 and 7 and end legs 8 which rest upon a suitable base, as shown.

A rotatable and vertically movable drum or receptacle 9, is provided, the same having a plurality of compartments 10 therein for receiving and discharging the drum to be registered. This drum is fixed on a shaft 11 having its ends journaled in the parallel ends of a balance beam 12, the opposite ends of which diverge toward each other and are integrally connected together and from which depends a suspension loop 13. Eye bolts 14 extend from the upper bar 7 adjacent their forward ends in which are loosely engaged U-shaped hangers 15 formed with eyes 16. A knife edge 17 extends horizontally from the forward end of each of the supporting arms of balance beam and is engaged to the eyes 16, it will be thus seen that upon loading of the uppermost compartment of the drum the balancing beam will rock on the knife edge 17 to allow the drum to rotate forwardly. The usual weights are suspended from the loop 13 to balance the balance beam 12.

The compartments 10 are adapted to be successively brought into the upper-most or filling position. This is accomplished by a keeper 16′ provided with a laterally extending nose 17 adapted to be engaged by stops 18 mounted upon the ends of the drum. These stops are arranged to stop the rotation of the drum nut as the compartment reaches the uppermost position.

The revolution counter mechanism supported on the frame adjacent to the drum is designated generally at 19. This mechanism includes an outstanding arm 20 that is actuated to operate the counting mechanism by a member carried between the drum which engages this arm upon each revolution of the drum.

A recorder, is provided, for reporting the weight, principally the overweight, placed in the compartment, and includes a casing, 21, having the integrally rear wall 21′ in which is positioned the threaded end 22′, of the shaft 23′, on which is supported the dial 24′, which dial is provided with suitable graduations, which coöperate with the indicating hand 23, also secured to the shaft 22′.

The dial 24′, is rotatable on the shaft 22′, due to its connection with the ratchet wheel 23′, and it will be seen that movement of the arm 24, which is also rotatably mounted on the shaft 22′, causes a relative movement of the ratchet wheel 23′, due to the operation of the pivoted pawl 27, carried by the arm 24, and engaging the teeth of the ratchet wheel 23.

The operating arm 26, is rotatably mounted on the shaft 26′, and is supplied with the weight 27′, on one end thereof, which weight acts as a counter balance, to restrict the movement of the arm 26, caused by the tension of the spring 29. The link 25, has its upper end connected with the lever 26 as at 28′, the opposite end thereof having an elongated slot 29′, which accommodates the pin 30′, secured to one end of the arm 24, so that movement of the arm 26 produces a relative movement of the arm 24 thereby causing a movement of the dial, to indicate, as before described.

The casing 21, is provided with the flanges 31′, which flanges form a support for the glass front 32′, which glass permits an observation of the dial 24′, so that the indications within the casing may be readily determined.

A contractile spring 29 encircles the rod 28 and has one end fixed to the frame and its opposite end fixed to the rod. The lower end of the rod 28 is formed with a head 30 which is disposed in the path of movement of the weight end of the balance beam 12, which moves this rod upwardly to actuate a recording mechanism. Upon the descent of the drum, the contractile spring returns the various parts to their normal position upon the return of the drum to its original position.

An endless conveyer 30 is mounted above the frame 5 and is arranged to convey the bulk to be weighed to the drum.

In the operation of the scales the bulk is deposited in the uppermost compartment of the conveyer. Upon overbalancing of the balance beam the latter swings downwardly disengaging the lug that is engaged with the nose, from the same, carrying the drum, which, owing to the weight of the contents of the uppermost compartment rotates forwardly far enough to dump the contents of this compartment, the rotating movement of the drum stopping, when a second compartment has reached the uppermost position to receive a load.

The embodiment of the invention shown and described is one form of the invention, but it will be understood that the same may be modified and altered in many respects and that our limits of modification are only governed by what is claimed.

What is claimed is:

1. In a weighing scales, a frame, a horizontally disposed balance beam mounted thereon, a receptacle associated with one end of the balance beam, a dial casing mounted on the frame above the outer end of the balance beam, an indicating dial supported in the casing and an indicating hand associated with the dial and having one end weighted, operative connections between the weighted end and indicating hand, a lever supported on the casing and having a vertical movable operating rod connected with one end of the lever disposed in the path of movement of the balance beam to be raised, thereby to actuate the indicating hand, and expansible means normally urging the operating bar downwardly.

2. In a weighing scales, a fulcrumed balance beam, a dumping receptacle mounted in one end of the beam and having a plurality of compartments adapted to be successively filled and dumped, a coiled spring having connection with the opposite end of the beam for counterbalancing the beam, a keeper supported by the frame, and means supported on the receptacle adapted to contact with the keeper for restricting rotary movement of the receptacle and a conveyer mounted above the frame to carry material to the receptacle to deposit material in the compartments of the receptacle successively.

In testimony that we claim the foregoing as our own, we have hereto affixed our signatures in the presence of two witnesses.

GEORGE A. EVANS.
JAMES E. ELLISON

Witnesses:
JAMES J. RAY,
JAS. T. JACOBSON.